United States Patent Office.

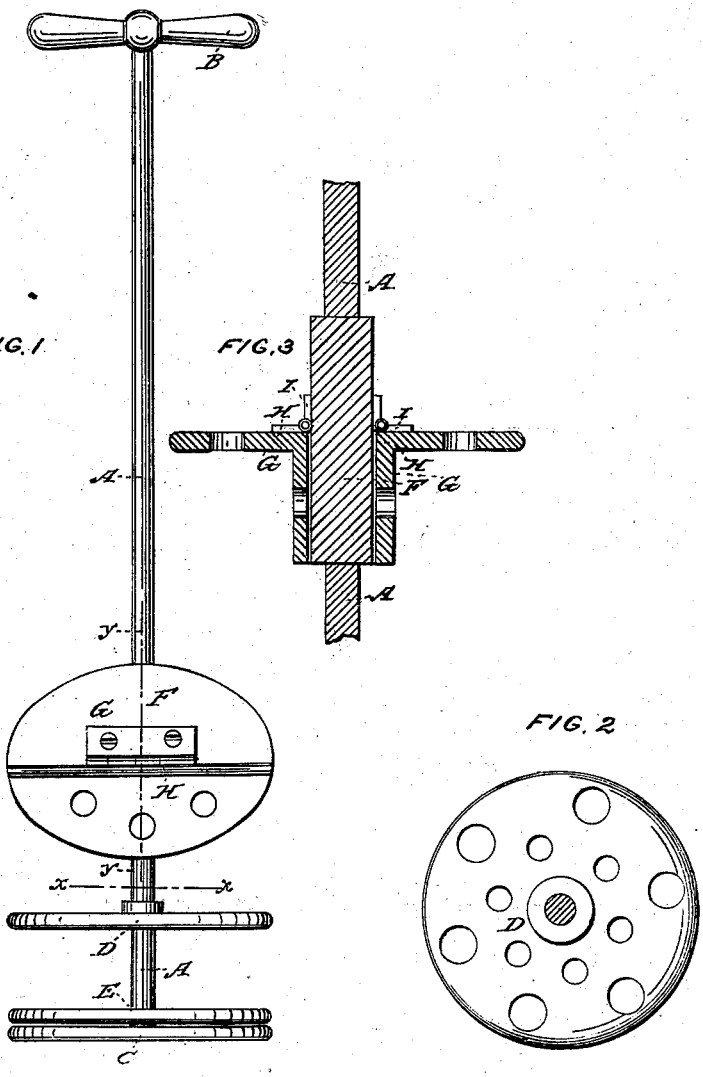

J. W. PETTENGILL, OF ROCKFORD, ILLINOIS.

Letters Patent No. 68,000, dated August 20, 1867.

IMPROVEMENT IN CHURN-DASHER.

*The Schedule referred to in these Letters Patent and making part of the same.*

TO ALL WHOM IT MAY CONCERN:

Be it known that I, J. W. PETTENGILL, of Rockford, in the county of Winnebago, and State of Illinois, have invented a new and improved Dasher for Churns; and I do hereby declare that the following is a full, clear, and exact description thereof, which will enable those skilled in the art to make and use the same, reference being had to the accompanying drawings, forming part of this specification.

The present invention relates to a dasher for churns more particularly, which in its construction in fact embraces two in one, it working to crush or mash the cream without a rubbing or grinding movement, which, as is well known, has a tendency to leave the butter soft and salvey, while if mashed or crushed it is rendered hard and brittle. In the accompanying plate of drawings my improved dasher for churns, &c., is illustrated—

Figure 1 being a side elevation of the same.

Figure 2, a plan or top view of one section of plate thereto, and

Figure 3 a partial vertical section.

Similar letters of reference indicate corresponding parts.

A, in the drawings, represents the shaft or spindle to the dasher. This shaft A, at one end, has a cross-handle, B, and at the other has secured to it a circular plate or disk, C, in and through which is to be made a series of holes, such as are shown in fig. 2. Above this disk C, on the stem, is secured another similarly perforated disk, D, between which and the lower one, C, on the spindle, is arranged to play or move a perforated disk, E, the perforations in the several plates being so located as not to be opposite to or in corresponding positions with each other. F, a centre-piece fixed to shaft A above its upper disk D. This piece F is made flat upon its two pieces G, and to each of such faces a similar right-angular wing, H, is hinged at its angle I. These wings H through both of their sides J are perforated.

In the operation of the dasher, above described, as it is forced down through the cream, the cream rushes or passes through the holes in the lower disk or plate C, driving the loose intermediate disk E up against the upper disk D, because of the holes in each disk being so located as not to correspond in position. At the same time the wings at the upper centre-piece G are brought forcibly against the same above the joint, and *vice-versa*, as the dasher is raised.

The effect of the above operation of the dasher is to break up the globules of cream containing the butter, and to gather or collect the butter immediately.

I claim as new, and desire to secure by Letters Patent—

A dasher for churns, &c., consisting of three or more perforated disks or plates C, D, and E, arranged together substantially as and for the purpose described I also claim the centre-piece to the stem or handle, carrying angular perforated wings, substantially as and for the purpose described, and whether used in combination with the three or more disks to such stem or not.

J. W. PETTENGILL.

Witnesses:
　A. C. BREARLEY,
　H. H. WALDO.